Sept. 29, 1953        G. F. MARTIN        2,653,822
VEHICLE TOWAGE CONTROL
Filed July 18, 1949                                2 Sheets-Sheet 1
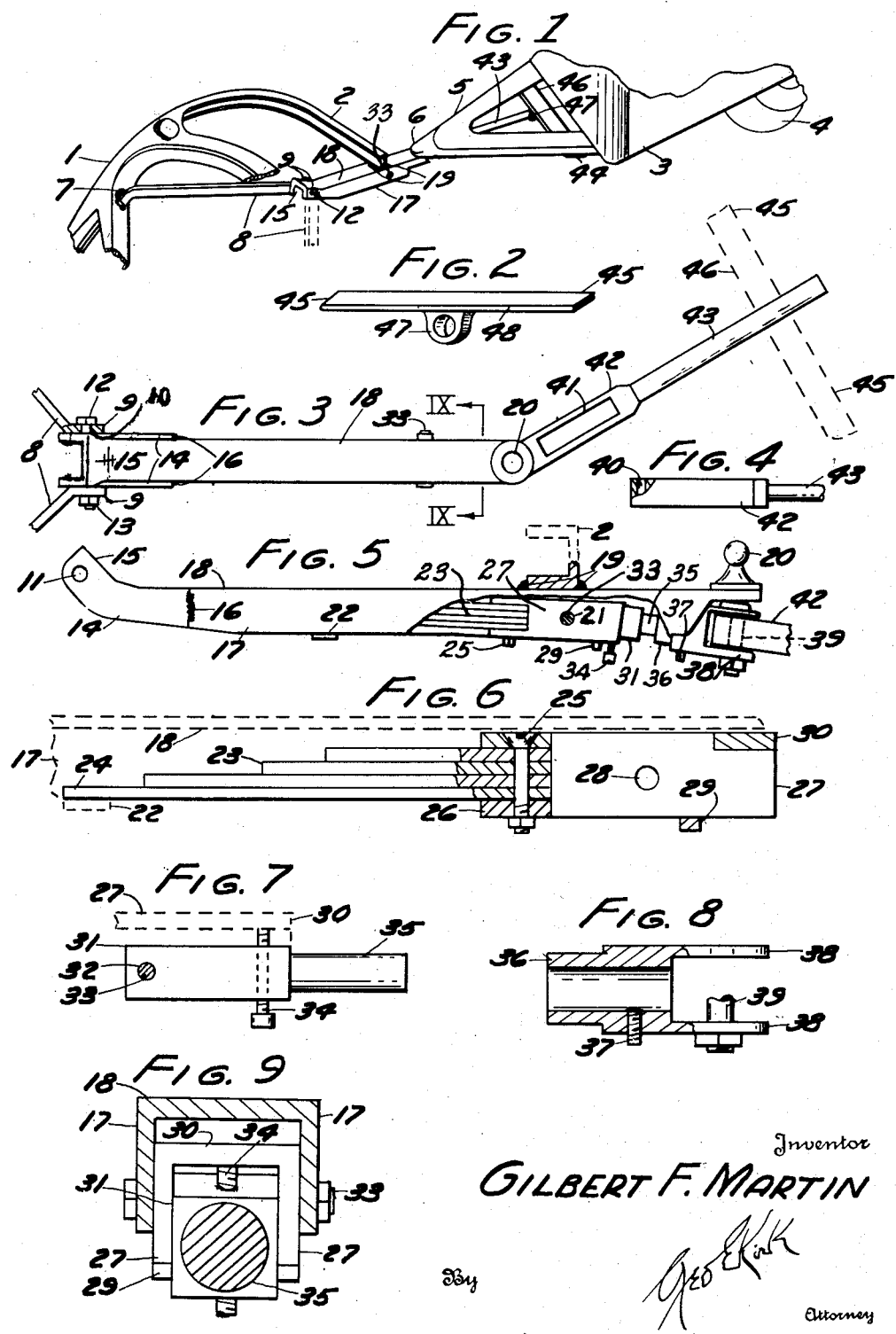
Inventor
GILBERT F. MARTIN

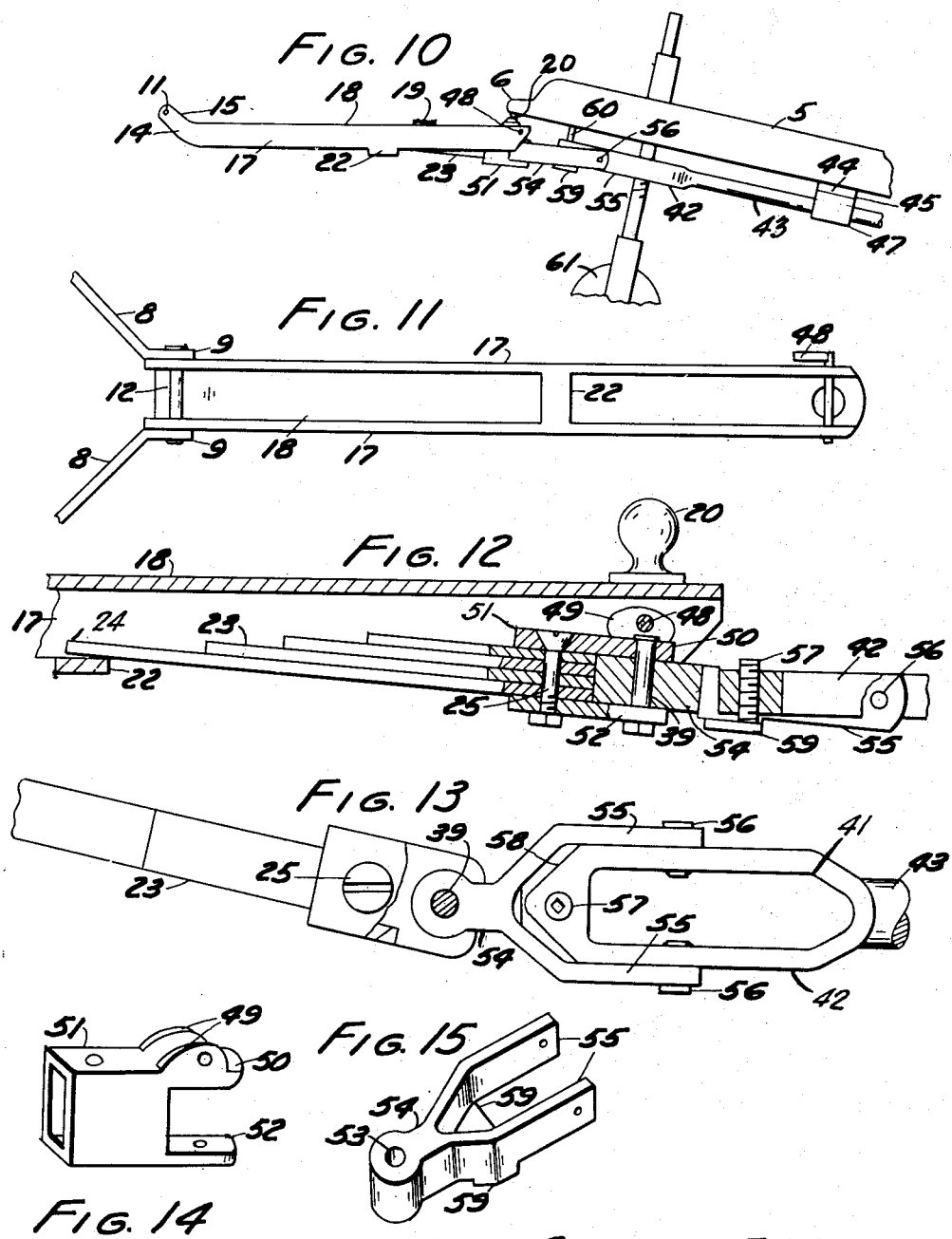

Patented Sept. 29, 1953

2,653,822

UNITED STATES PATENT OFFICE 2,653,822

VEHICLE TOWAGE CONTROL

Gilbert F. Martin, Jonesville, Mich.

Application July 18, 1949, Serial No. 105,367

12 Claims. (Cl. 280—33.9)

1

This invention relates to coupling flexible connections, especially between a power propelled vehicle and a vehicle to be hauled thereby, with adaptable control means.

This invention has utility when incorporated as a haulage arm or draw-bar, say from a passenger type of automobile, for a trailer, even of the two-wheeled type, for the trailer or follower vehicle to retain its poise and minimize traction disturbance transmission to the tractor or vehicle connected thereto to perform the pulling operation.

Referring to the drawings:

Fig. 1 is a fragmentary view in perspective of after portions of an automobile chassis equipped with an embodiment of the unit of the invention in operative connection to a trailer;

Fig. 2 is a perspective view of a slide-guide plate fixed with the trailer V-tongue under side for a swingable control arm;

Fig. 3 is a plan view of the pull channel of the coupling and the swingable arm therefrom;

Fig. 4 is a side elevation of the pivot connection end for the control arm;

Fig. 5 is a side elevation of an assembly of the parts adjacent the pull channel portion of the coupling with a part of said channel and adjacent connecting parts broken away, which channel is fixedly connected with the automobile and provides the knuckle to be capped by the trailer tongue socket;

Fig. 6 is a side elevation, on an enlarged scale, portions being broken away, of a leaf spring yield device adapted to be housed by the downwardly open channel;

Fig. 7 is a side elevation of a link portion adapted to have adjustment in its range of movement relatively to the device;

Fig. 8 is a view in longitudinal section of the link completing portion for pivoting to the control arm coaxial with the knuckle on the channel bar as engaged by the tongue socket;

Fig. 9 is an enlarged view in section on the line IX—IX, Fig. 3, showing the nesting in the channel of the device pivot providing region and the link portion assembled therein;

Fig. 10 is a side elevation of an assembly modification wherein the adjustable link trails from the pivot knuckle, instead of being forward therefrom as shown in Fig. 5;

Fig. 11 is a bottom plan view of the haulage vehicle mounted rigid towage channel responding to the modification in Fig. 10;

Fig. 12 is a fragmentary section thru the towage channel showing the adjustable link connection to the slide guide;

2

Fig. 13 is a plan view of the yield portion or spring arm with the link therefrom to the slide guide head end;

Fig. 14 is a perspective view of the spring carrying block, adapted to have the rockable mounting in the channel; and Fig. 15 is a perspective view of the adjustable link adapted to connect the block of Fig. 14 to the slide guide head end.

A side frame 1 (Fig. 1) of a self-propelled vehicle or automobile chassis is herein shown with a rear cross bar or rail 2. A vehicle-to-be-towed has a body 3 adapted to be approximately balanced on a pair of ground wheels 4. Rigid with the trailer body 3 is a forwardly extending V-tongue 5 to a socket or cap 6.

Welds 7 fix a pair of converging and rearwardly extending on-edge rigid metal arms or straps 8 with the chassis frame sides 1. In practice it is desirable to have these straps 8 so located that their converging portions may be clear of the automobile differential centrally of the vehicle rear axle. Aft-directed parallel end portions 9 of the respective straps 8 have openings 10 therethru to be aligned with each other and openings 11 therebetween for a bolt 12 to have thereon and locked therewith a nut 13 in completing assembly of the straps 8 with a rigid haulage connection or attachment.

The openings 11 are in wings or parallel side portions 14 of an offset or upwardly directed channel section 15. The side portions 14 extend to have weld connections 16 with side flanges 17 from a web 18 of a major channel or housing section drawbar for the unit. The web 18 may have a weld connection 19 with the cross rail 2, thereby with the two arms 8 and this third anchorage means 19 coacting to position the channel as a substantial coupling element for a knuckle 20 to rise from the after upper end portion of the web 18, and adapted to be there capped by the socket 6 of the trailer tongue 5. From the bolt 12 to the knuckle 20, the downwardly open channel 17, 18, is a staunch rigid unit. Instead of initially having the offset 15 integral with the channel 17, 18, there is left open the door for general application of this haulage or tow coupling to different types of vehicles. It is of importance to have the connection at the bolt 12 clear of the automobile differential. This may necessitate some length computation to keep the knuckle 20 at a proper spacing from the rail 2, bumper or other after portion of the automobile. Upon determining this requirement, should it not require any cutting off of forward portions of the web 18, and flanges 17, the welds 16 give the coupling tailor-made status.

The yield device

The side flanges 17 of the channel, spaced from the knuckle 20, have aligned pivot-pin providing openings 21, and further toward the bolt 12, there is a rigid cross-connection 22 between the free edges of the flanges 17. An adjustable flex responsive multi-leaf spring 23 (Fig. 6) may have its free end 24 coact with the support or holder bar portion 22.

A bolt 25 assembles the leaves of the spring 23 with a rectangular block 26 adapted snugly to ride between the flanges 17 and under the web 18. The block 26 is hollow at the region to have fitted and held therewith the leaf spring 23 by the bolt 25. A fork or pair of parallel plate extensions 27 from the block portion 26 provide a pair of aligned pivot pin openings 28 with a lower minor hold-limit or stiffening cross strip 29 and a major upper cross strip 30 adjacent the free ends of the fork arms 27.

The link

Adapted to rockably fit between the arms 27 of the fork of the yield device is a square cross section link-end or block 31 (Fig. 7) having an opening 32 therethru for a pivot pin 33. In the completion of the assembly of the yield device with the coupling channel 17, 18, the openings 21 of the flanges 17, and the openings 28 of the fork arms 27 are in alignment with the opening 32 of the link end 31 to receive the pivot pin 33.

A set screw 34 thru the link-end 31 spaced from the opening 32 may have its upper end protrude to ride against the under side of the cross strip 30, and thereby provide adjusting means for out-of-line or downward deflection direction for a cylindrical projection or seat portion 35 from the link-end block 31.

A sleeve 36 with a set screw 37 may provide aligned assembly for the link opposite end fork 38 with the portion 35. A pivot pin 39 is brought to alignment coaxially with the vertical axis of the knuckle 20 with the cap 6 thru the set screw 37 locking of the sleeve 36 with the cylindrical portion 35 (Fig. 8).

The control arm

It is to be noted that the yield device and its adjustment features are housed in the downwardly open channel of the coupling as fixed rigidly with the vehicle performing the towing operation.

The pin 39 of the link from the yield device is thru an eye 40 of an arm having a rectangular slot 41 in a square portion 42 extending to a cylindrical portion or slide portion 43 (Figs. 3, 4).

Spaced back from the cap 6 and toward the body 3, to leave the upper side of the V-tongue 5 clear, welds 44 anchor ends 45 (Figs. 1, 2) of a cross plate 46 snugly against the under side of the V-tongue 5. The plate 46 medially of its under side has a slide guide or ring 47 fixedly anchored with the plate 46. Thru this ring 47 the portion 43 of the control or swingable arm extends.

There is thus provided a trailer hitch or haulage connection of a follower car with automatic or self-responsive hinge control. The initial adaptation, as set forth, is in the placing of the coupling channel 17, 18, to provide the towage knuckle 20. The adaptation for the trailer is the plate 46 to provide the guide for the swing control arm 42, 43.

Inasmuch as the knuckle 20 is spherical, it permits not only turning for the lead vehicle in the towing, but is adapted to conform to a normal level or haulage balance position for the follower car as to its load for the pair of ground wheels 4. The poise for this vertical adjustment is effected thru the set screw 34 in directing the link 31, 35, 36, 38, between its relatively crosswise pins 33, 39. It is to be noted that this directing action for the link is not positive, for the set screw 34 rides against the portion 30 of the fork 27 at the block 31 of the yield device. There may be limit to the up-flexing as against the underside of the web 18 of the channel, and to the down-flexing as the block portion 26 remote from the portion 30 moves against the underside of the channel web 18. In the yield operation, tilting of the link-end portion 31 away from the portion 30 is toward the portion 29. As this is contacted, there is reduction of the initial pressure setting of the spring end 24 on the hold portion 22.

The vehicle towage control embodies the fixed draw-bar section herein shown as a downwardly open channel, the after end portion of which may have some positive anchorage or connection, whether it be some assembly means with the bumper or other rear cross portion, specifically herein shown as the rear rail 2 of a chassis for a passenger type of automobile. As the forward or self-propelled vehicle takes corners or makes other turns, the knuckle 20 in its hinge pivot coaction with the cap 6, allows the trailer to adapt to such lead turn. This involves a side-wise swing for the control arm 42, 43. However, in the preferred set-up, it is desirable to have the pivot pin 39 coaxial with the vertical axis provided with the knuckle joint 20 and the cap 6. This is done by the set screw 37 locking the sleeve 36 on the cylindrical stem portion 35, at such position for aligning the axes. In the event such be disturbed or not quite accurate, the slide action at the ring 47 with the arm portion 43 precludes any binding, locking or other disturbance. Actually, in practice there is at least some out-of-alignment between the knuckle cap axis and the axis for the pin 39. This developes as there is travel over hummocks or other travel or road way uneven conditions. As installed, the leaf spring 23 has a hold within its elastic limit for the end 24 to ride slidably on the support 22. There is not transmission from the trailer at an abrupt rise or descent for the rear vehicle to modify the traction load on the rear wheels of the forward vehicle. Upon installing the unit between the haul performing vehicle and the specific trailer therefor, there is taken into account the proper height position for the tongue 5. Sufficiently down to preclude the cap 6 from jumping clear of the knuckle 20, there is yieldable holding thru the control arm 43 and the plate 46. For level highway travel, the set screw 34 may be adjusted for the approximate alignment between the arm, link and device. Inasmuch as this system has each end relatively free, the spring 23 at one end and the slide guide at the ring 47 at the other, there is minimized occasion of disturbance of weight equalization on the ground wheels and avoidance of carrying of sidesway from one vehicle to the other.

The haulage channel 17, 18, in the modification shown in Figs. 10 to 15 inclusive, has the pivot pin 48 located in proximity to being intercepted with the vertical axis extended downward from the knuckle 20. The pivot pin 48 thru the flanges 17 (Figs. 12, 14) extends thru ears 49 from a top arm 50 of a block 51 having the screw 25 for anchoring the spring leaves 23 to ride on the holder bar portion 22.

Downward from the arm 50, the block 51 has an arm 52. These arms 50, 52, are in parallel and extend rearward with vertical aligned openings to receive the pivot pin 39. While not directly co-axial with the vertical axis of the knuckle 20, this pin 39 is close thereto, thereby associating the three joints in such relation for mutual response that there is minimized occasion for binding or cramping therebetween.

The pin 39, is thru an opening 53 of a link 54, thereby having hinge connection on a vertical axis with the spring mounting block 51. The link 54 in its extent aft from the pin 39 has a fork portion of a pair of arms 55 having horizontal axis pivot connections 56 with the block or slot portion 41 having the slide extension 43 therefrom to coact with the eye or guide ring 47.

The tilt or vertical control leveling adjustment here, instead of the set screw 34 of Fig. 7, is by a set screw 57 in a forward extension portion 58 from the slotted block 41. A cross web or abutment 59 at the under side between the arms 55 remote from the pivots 56, is engaged by the lower end of the screw 57. The screw 57 has a wrench receiving upper socket end for a wrench 60, thereby to allow the tongue 5 to drop after the spring end 24 hits the underside of the web 18, while any up movement from the set screw adjustment for the link, thru the spring 23 yieldably transmits such as a hold-down for the hauling vehicle. The slot or clearance 41 permits dolly wheel 61 adjustment at non-haulage location of the trailer.

The coupling and uncoupling procedure is quickly carried out hereunder. Upon pulling out the pin 48 to clear the ears 49, the spring mounting block 51 with its spring 23 is released so that as the dolly wheel 61 is set to relieve the knuckle 20 from the cap 6, there is completed disconnection of the haul-effecting vehicle or automobile from the vehicle-to-be-hauled or trailer.

The knuckle 20 and cap 6 as assembled provide the normal haulage connection between the vehicles. There may be the purpose to have the trailer 3 load close to balanced on the wheels 4. Under normal traffic conditions, there may be fore-and-aft rocking of the trailer 3. The practice is to so assemble the knuckle 20 with the cap 6 that the cap 6 may not jump clear thereof. Under the invention herein, there is an adjustable vertical load transmission or control between the vehicles brought about by the spring, link, slide and the after-car rise stop or limit yield coacting thru the positioning of the set screws 34, 57.

An illustration of practice achieved hereunder is with an automobile Pontiac 8 of 119" wheel base and no overload springs which without trailer had rear axle load of 2060#, front axle load of 2150#. Trailer with a load of 390# at the draw bar or coupling, showed front axle load of 1970# and the rear 2630#. Thru the set screw adjustment establishing a desirable driving condition for the Pontiac, the front axle load showed 2110#, rear 2320#. There was achieved a still more close approach to the Pontiac normal axle load condition by a further adjustment showing front axle 2200# and the same for the rear. It is thus seen that the automobile may have driving advantage as for normal rear seat loading without occupants or actual load therein, with overloading avoided in the event there be rear seat load in such car.

What is claimed and it is desired to secure by Letters Patent is:

1. A vehicle chassis having a rear cross portion and side frame portions therefrom, a coupling housing section anchored with the rear cross portion with the section extending forwardly between the side frame portions, strap means fixed with the side frame portions and converging rearwardly, means fixing the converging strap means with the forward end of the housing section in completing assembly of the section as a draw-bar with the vehicle, a trailer vehicle having rockable hinge connection directly with the housing section, said trailer vehicle having a guide directed toward the hinge connection, a yield device in the housing section, and a control arm slidable in the guide and having connection to the yield device with a pivot joint adjacently coaxial with the hinge connection.

2. An adaptable towage connection for an automobile to a two-wheeled type of trailer having a cap end tongue, said connection comprising a draw-bar open-bottom channel fixed with the automobile chassis and extending rearwardly therefrom with an upstanding knuckle to be engaged by the cap, a slide guide fixed with the underside of the tongue rearwardly from the cap, a leaf spring yield device, a link from the device, a common pivot pin assembling the device and link in the channel, said link being of adjustable length to register a pivot pin end coaxial with the cap and knuckle forming hinge, and a control arm from the pivot pin end to the slide guide to act therefrom on the yield device.

3. A haulage-knuckle-providing aftward extending coupling element, a leaf spring, a rockable mounting for the spring to coact with the element and extend forwardly of the knuckle portion of the element, a link extending aft from the knuckle portion, having horizontal swing connection to the mounting and providing a vertically rigid extension from the mounting, a slide guide aft extending from the knuckle portion and having connection with the hauled vehicle tongue, said link having vertical axis swing connection to the guide, and an adjustable stop means between the guide and link coacting to transmit remote guide lift thru the link to the spring.

4. In a tractor and trailer hitch having one member mounted on said trailer and another member mounted on said tractor, a ball mounted on one of said members, a socket connected to said other member fitting with said ball to form a ball and socket joint, the improvement comprising: a horizontal pivot mounted on said one member, a block mounted on said horizontal pivot, a vertical pivot mounted on said block and vertically aligned with the vertical axis of said ball, stop means on each of said members, and means cooperating with said stop means for limiting rotation of said block in both directions about said horizontal pivot, said limiting means comprising a first means fixed with said block and a second means mounted on said vertical pivot, one of said limiting means comprising a vertically resilient member.

5. In a tractor and trailer hitch having one member mounted on said trailer and another member mounted on said tractor, a ball mounted on one of said members, a socket connected to said other member fitting with said ball to form a ball and socket joint, the improvement comprising: a horizontal pivot mounted on one of said members, a block mounted on said horizontal pivot, a vertical pivot mounted on said block and vertically aligned with the vertical axis of said ball, stop means on each of said members, and means cooperating with said stop means for limiting rotation of said block in both directions about said horizontal pivot, said limiting means comprising a first means fixed with said block and a second means mounted on said vertical pivot, one of said limiting means comprising a vertically resilient member.

6. In a tractor and trailer hitch having separate members mounted on said trailer and said tractor, a ball mounted on one of said members, a socket connected to said other member fitting with said ball to form a ball and socket joint, the improvement comprising: a horizontal pivot mounted on said one member, a block mounted on said horizontal pivot, a vertical pivot mounted on said block and vertically aligned with the vertical axis of said ball, stop means on each of said members, and means cooperating with said stop means for limiting rotation of said block in both directions about said horizontal pivot, said limiting means comprising a first means fixed with said block and a second means mounted on said vertical pivot, one of said limiting means comprising a vertically resilient member.

7. In a tractor and trailer hitch mechanism having a draw bar member and a tongue member connected together through a rockable hinge connection, and having a control means between said members, said control means comprising: a block horizontally pivoted to one of said members, and a connection device between said block and said other member, said device being vertically pivoted to said block, there being a vertically resilient means acting through said block to one of said members for restricting the rotation of said block about said horizontal pivot.

8. A hitch according to claim 7 wherein said resilient means is directly attached to said block.

9. A hitch according to claim 7 including means to adjust the amount of restriction exerted by said resilient means.

10. A hitch according to claim 7 wherein said connecting device includes a slidable connection with said other member.

11. In a coupling between a tractor having a draw bar member and a trailer having a tongue member, said members being connected through a rockable hinge connection, and a control means between said members, said control means comprising: a block, a horizontal pivot transversely of one of said members, said block being fastened to said horizontal pivot, a connection device, means for connecting said device to the other of said members, a vertical pivot on said block, said device being fastened to said vertical pivot, and a vertically resilient means acting between said members and through said block to restrict the rotation of said block around said horizontal pivot.

12. A coupling according to claim 11 wherein said vertical pivot is substantially vertically aligned with said rockable hinge connection.

GILBERT F. MARTIN.

References Cited in the file of this patent
UNITED STATES PATENTS

| Number | Name | Date |
| --- | --- | --- |
| 2,133,202 | Lantz | Oct. 11, 1938 |
| 2,162,481 | Fry | June 13, 1939 |
| 2,238,095 | Almcrantz | Apr. 15, 1941 |
| 2,348,655 | Schuling | May 9, 1944 |
| 2,453,941 | Smit | Nov. 16, 1948 |
| 2,493,874 | Hume | Jan. 10, 1950 |